United States Patent [19]

Coulonvaux et al.

[11] Patent Number: 6,022,055
[45] Date of Patent: *Feb. 8, 2000

[54] LATCH ARRANGEMENTS; AIR CLEANERS WITH THE LATCH ARRANGEMENT; AND METHODS

[75] Inventors: Paul R. Coulonvaux, Brussels, Belgium; Thomas G. Miller, West St. Paul; Edward James Kreitinger, Apple Valley, both of Minn.

[73] Assignee: Donaldson Company, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,041

[22] Filed: Nov. 15, 1996

[51] Int. Cl.⁷ ..................................................... E05C 5/00
[52] U.S. Cl. .................................. 292/113; 292/DIG. 49; 24/270
[58] Field of Search ........................... 292/113, 246–250, 292/DIG. 49; 24/68 T, 330, 494, 270, 573.3

[56] References Cited

U.S. PATENT DOCUMENTS

| | | | |
|---|---|---|---|
| 611,445 | 9/1898 | Caster | 292/113 |
| 783,338 | 2/1905 | Ward | 292/247 |
| 899,084 | 9/1908 | Thoits et al. | 292/247 |
| 1,042,511 | 10/1912 | Watrous | 292/247 |
| 1,372,812 | 3/1921 | Harmon | 292/246 |
| 3,847,423 | 11/1974 | Gley | 292/113 |
| 4,213,643 | 7/1980 | Blind | 292/247 |
| 5,167,683 | 12/1992 | Behrendt et al. | |
| 5,480,197 | 1/1996 | Erust | 292/113 |
| 5,545,241 | 8/1996 | Vanderauwera et al. | |
| 5,547,480 | 8/1996 | Coulonvaux . | |

FOREIGN PATENT DOCUMENTS

| | | |
|---|---|---|
| 0 366 637 | 5/1990 | European Pat. Off. . |
| 0 641 578 | 3/1995 | European Pat. Off. . |
| 85 24 040 U | 2/1986 | Germany . |
| 2548381 | 6/1992 | Japan . |
| 2551392 | 11/1992 | Japan . |
| 2549337 | 3/1994 | Japan . |

OTHER PUBLICATIONS

Declaration of Thomas G. Miller with Exhibits A and B.
Declaration of Stan Koehler with Exhibits A–D.

*Primary Examiner*—Suzanne Dino Barrett
*Assistant Examiner*—Gary Estremsky
*Attorney, Agent, or Firm*—Merchant & Gould P.C.

[57] ABSTRACT

Latch arrangements for mounting on a first housing section to secure the first housing section to a second housing section are provided. The arrangements are particularly well adapted for utilization with air cleaner housings. Several designs described comprise bent wire arrangements having a first handle segment formed from a single piece of bent wire, and a latch or hook segment formed from a second piece of bent wire. Preferred configurations for utilization with plastic housing sections, are provided. An alternate latch arrangement, comprising a single molded latch member, is also provided.

15 Claims, 8 Drawing Sheets

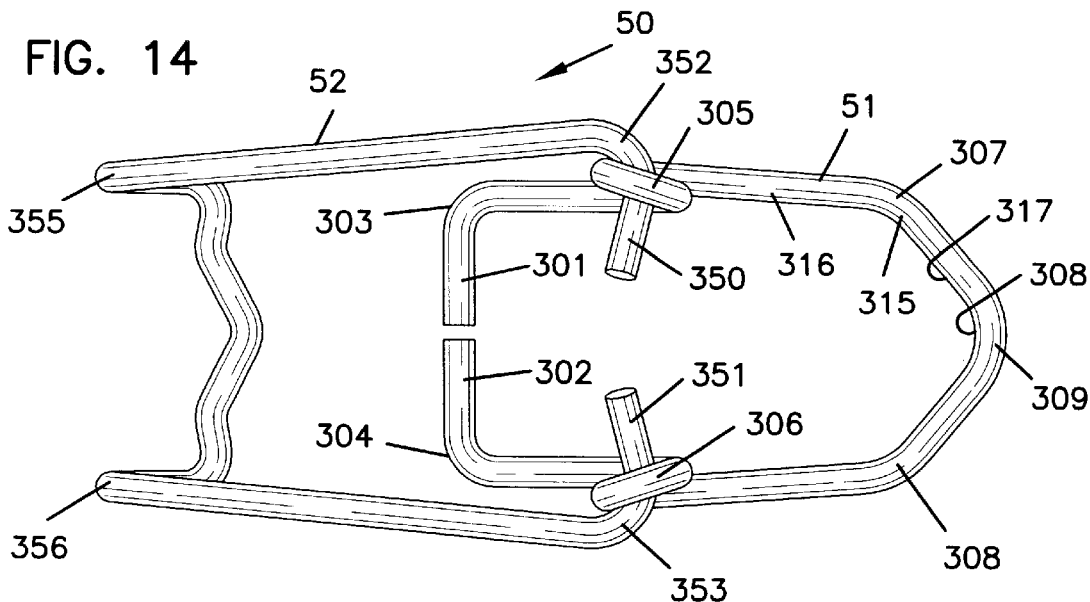
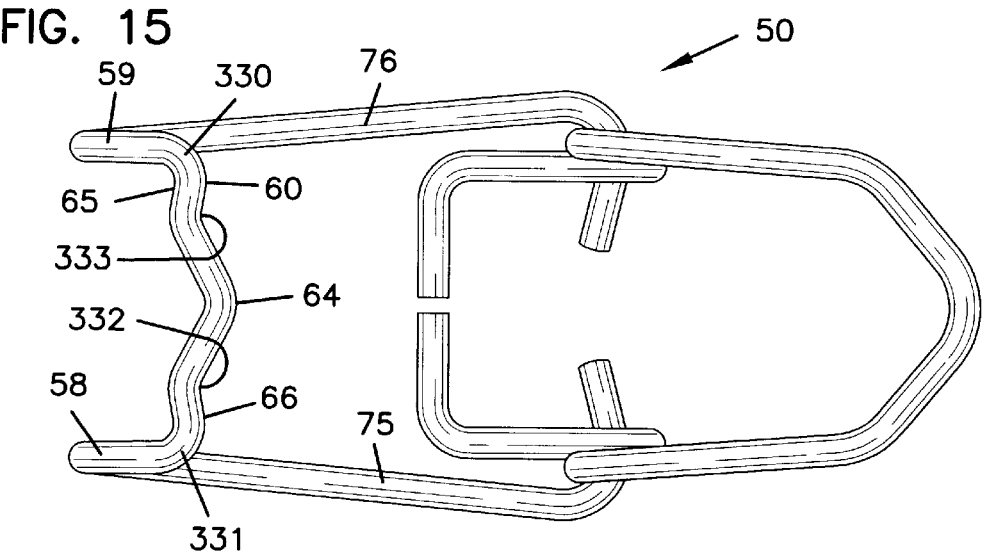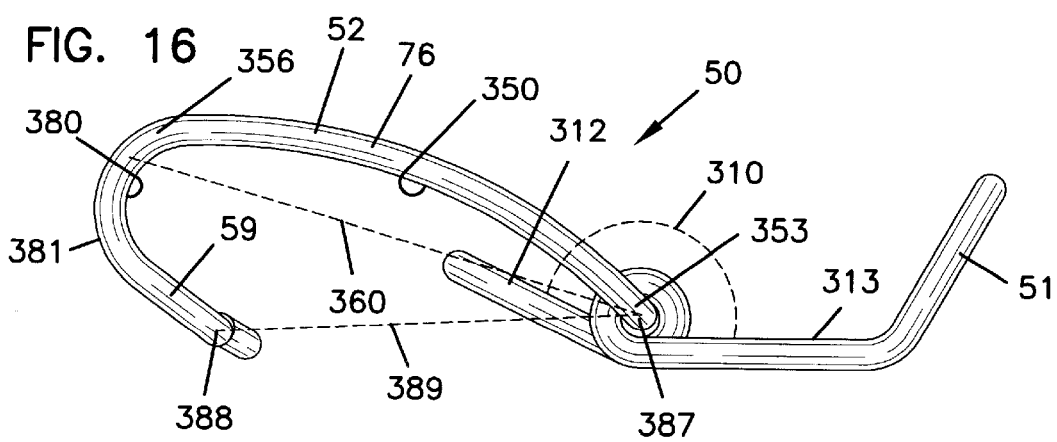

LATCH ARRANGEMENTS; AIR CLEANERS WITH THE LATCH ARRANGEMENT; AND METHODS

FIELD OF THE INVENTION

The present invention relates to latch arrangements. It particularly concerns latch arrangements specifically adapted for utilization in combination with air cleaner housings.

BACKGROUND OF THE INVENTION

Air cleaner housings often include two parts which need to be secured to one another, to retain the housing closed, during assembly and use. Convenient access to the interior of the housing is often necessary, for servicing. For example, if an air filter element within a housing needs to be serviced, it is typically necessary to release latches, for the housing to be opened.

Air cleaner housings are sometimes mounted on portions of vehicles having a limited field of access. It is desirable and necessary that the latch(es) be convenient to operate, even when access to them is somewhat restricted.

In some instances, plastic housings are used. Such housings may be constructed, for example, from a commodity grade plastic such as Himont polypropylene (20% glass filled) available from DuPont, Wilmington, Del., as HIMONT SB-224-2. Such plastic, especially if relatively thin, can be soft and somewhat subject to fatigue and/or damage upon repeated engagement with a securely clamped latch.

SUMMARY OF THE INVENTION

According to the present invention, various latch arrangements for mounting on a housing having a first housing section and a second housing section are provided. In general, the latch arrangements are constructed and arranged to be mounted on a latch mount on the first housing section, and to be selectively engagable with a receiving slot in the second housing section, to secure the first housing section and second housing section together.

In a first embodiment of the present invention, the latch arrangement comprises a handle segment and a latch segment pivotally mounted on the handle segment. For this embodiment, the latch segment preferably comprises a single, bent piece of wire, including a hook portion having an engagement lip. The engagement lip is configured to define a depending tip between first and second lateral support arms, the engagement lip being sized and configured such that when the latch arrangement is oriented to latch the first housing section to the second housing section, the depending tip projects into the receiving slot; and, when the latch arrangement is oriented to latch the first housing section to the second housing section, the first lateral support arm of the engagement lip bears on a portion of the second housing section which is on a side of the receiving slot opposite from a portion of the second housing section on which the second lateral support arm bears. In preferred arrangements, the first and second lateral support arms are co-planer extensions of the bent wire, each having a length, between bends, of at least about 0.03 inch (typically about 0.06 inch)(i.e., about 0.07–0.16 cm). Preferably the engagement lip comprises an extension of wire at least 0.5 inch long (i.e., about 1.2–1.3 cm), which extends between lateral hook extensions spaced at least 0.4, typically about 0.57 inch, apart (i.e., about 1–1.5 cm), at the point of engagement with the engagement lip.

In preferred arrangements, the depending tip projects a distance of at least 0.05 inch (typically about 0.08 inch)(i.e., about 0.1–0.3 cm) from the co-planer first and second lateral support arms. Preferably, the depending tip comprises bent wire in a generally "V" configuration.

In certain preferred embodiments, the latch arrangement includes first and second laterally spaced hook extensions, each of which is pivotally secured to the handle segment. In certain arrangements, each of the first and second hook extensions preferably includes an extension arm and a curved hook end. The curved hook end is preferably curved on a radius of about 0.15 to 0.2 inch (typically 0.170 inch)(i.e., about 0.3–0.6 cm). The extension arm of each hook extension preferably comprises an arcuate extension of wire having a length of at least 1 inch (i.e., about 2–3 cm) and curved such that a direct, linear, distance between end points of the arcuate extension, for any given extension arm, is about 1 to 5% shorter than the actual length of the wire's arcuate extension, along the arc.

Certain preferred latch arrangements according to the present invention comprise bent wire such that each one of first and second hook extensions includes an arcuate extension arm and a curved hook end such that the arcuate extension arm is curved on a radius no smaller than about 1.0 inch (i.e., about 2–3 cm), and preferably about 1.3 to 1.7 inch (typically about 1.50 inch)(i.e., about 3.2–4.4 cm). Of course a perfectly circular arcuate extension is not required.

Also, or alternatively, certain preferred latch arrangements according to the present invention are configured such that each one of the first and second hook extensions includes an arcuate extension arm and curved hook end configured such that when the latch arrangement is in a horizontal latched orientation viewed in side elevation, with latch operation being horizontal, an apex or highest point of each arcuate extension arm of each hook and extension is positioned directly above said depending tip of said engagement lip. In this context, the term "directly above" means that the apex is positioned within an angle of about 15°, preferably within about 10°, on either side of a vertical line intersecting the depending tip of the engagement lip.

In addition, according to the present invention, an air cleaner housing arrangement is provided. The air cleaner housing arrangement preferably includes a first housing section having latch mount thereon, and a second housing section having a latch receiving slot therein. The air cleaner housing also preferably includes a latch arrangement as described herein, mounted on the latch mount and oriented to selectively secure the first housing section to the second housing section, in use. In certain embodiments, the preferred latch arrangement is as described above.

Also herein, methods for assembly and use are presented.

BRIEF DESCRIPTION OF THE DRAWINGS

in FIG. 6 the latch arrangement being depicted part way toward a closed or latched configuration, from the orientation shown in FIG. 5;

FIG. 8 being from a viewpoint generally analogous to that shown in FIG. 4 for a prior art latch arrangement;

FIG. 11 being generally otherwise analogous to FIG. 7;

FIG. 14 is a top plan view of the latch arrangement shown in FIGS. 8–11, dismounted from any housing arrangement;

FIG. 15 is a bottom plan view of the latch arrangement shown in FIG. 14;

FIG. 16 is a side elevational view of the latch arrangement shown in FIGS. 14 and 15;

in FIG. 20, phantom lines depicting certain housing parts of optional configuration.

DETAILED DESCRIPTION

I. A Prior Art Latch and Air Cleaner Arrangement

Figure 1:
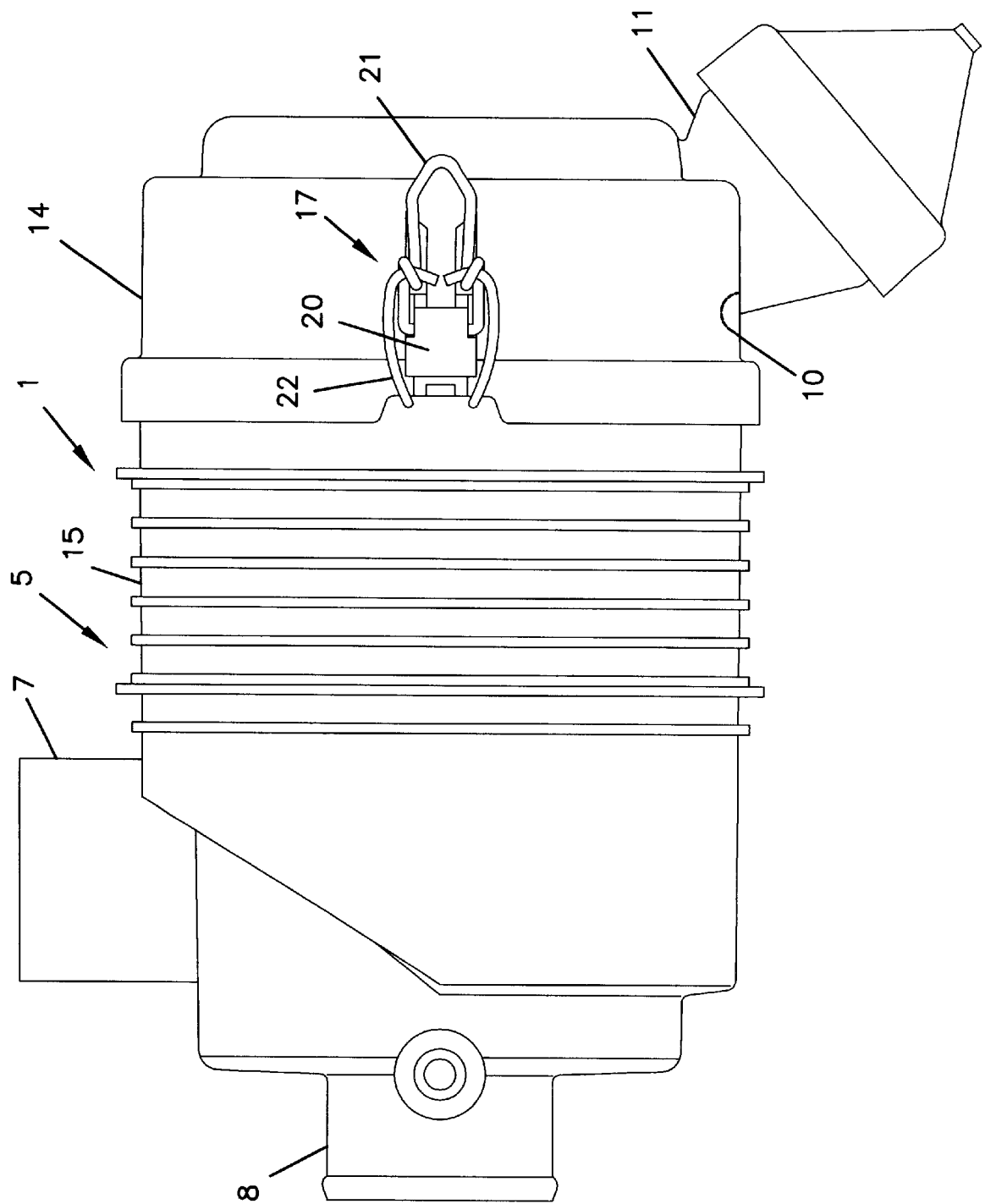
FIG. 1 is a perspective view of a prior art air cleaner arrangement, having a prior art latch arrangement positioned thereon.
Figure 2:
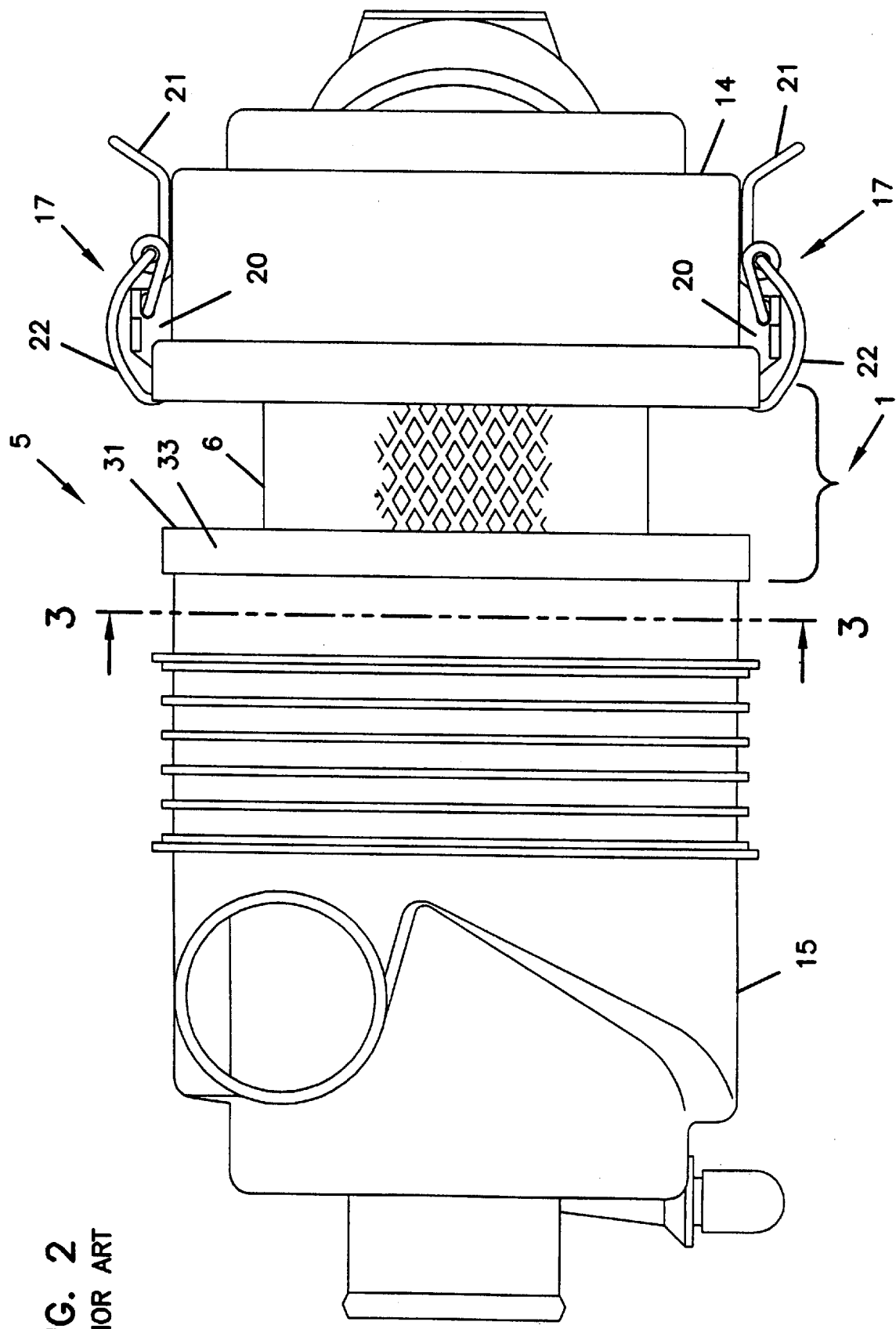
FIG. 2 is an exploded perspective view of the arrangement shown in FIG. 1.

Attention is first directed to FIGS. 1–7. In FIGS. 1 and 2, a prior art air cleaner housing arrangement 1 is depicted. In general, the arrangement 1 includes a housing 5. The housing is configured to appropriately receive therein a filter element 6, FIG. 2. In general, air cleaner housings such as housing 5 include appropriate structure for entry of air to be filtered, and exit of filtered air to an air intake system. For example, the particular arrangement shown is part of an air intake system of an engine for a vehicle such as a truck, agricultural equipment (tractor), or industrial specialty equipment (forklift). For the particular housing 5 shown in FIGS. 1 and 2, the air inlet for air to be filtered is depicted at 7, and a clean air outlet to the engine intake is indicated at 8.

The particular housing 5 depicted in FIGS. 1 and 2, utilizes a "cyclonic separation" system, for a selected level of prefiltering. That is, when the air to be filtered enters through inlet 7, it is moved through the housing 5 in a somewhat cyclonic pattern. When this occurs, some material carried in the air stream will drop from the air stream, to the "bottom" of the air cleaner, indicated generally at region 10, FIG. 1. At bottom 10, a conventional discharge vent arrangement 11 (optional) is depicted, for removal of this material.

The housing 5 of air cleaner arrangement 1 comprises first and second sections 14 and 15. Sections 14 and 15, when the air cleaner arrangement 1 is assembled, define the housing 5. When sections 14 and 15 are pulled apart, access to the interior of the housing 5 is provided. In this manner, an air filter 6 operably positioned within the housing 5, can be serviced. In FIG. 2, the sections 14 and 15 are shown pulled separated, exposing element 6. If sections 14 and 15 are further separated, element 6 can be serviced. From the drawings, it will be apparent that for the particular assembly shown, each of sections 14 and 15 is somewhat dish or bucket shaped, that is, each has an end and a somewhat cylindrical sidewall. For the particular arrangement shown, neither one of the sections 14 and 15 is simply an end cover, but rather each has a sidewall which is relatively deep, i.e., at least 2.5–5.0 cm deep. In typical such arrangements, the sidewall for section 15 will be about 5 inches to 10 inches long (i.e., about 12–26 cm), and the sidewall for section 14 will be typically 2 inches to 6 inches (i.e., about 5–16 cm) long. Such filter housings will generally be of appropriate configuration for vehicles and machines such as: backhoes; skid steer loaders; wheel loaders; tractors; sprayers; generators; small trucks and passenger vehicles.

Sections 14 and 15 are secured to one another by latches 17. In typical systems, at least two latches 17 are provided. In systems having cylindrical housings of about 6 inches (i.e., about 15–16 cm) in diameter or larger, at least three latches are typically used.

Figure 4:
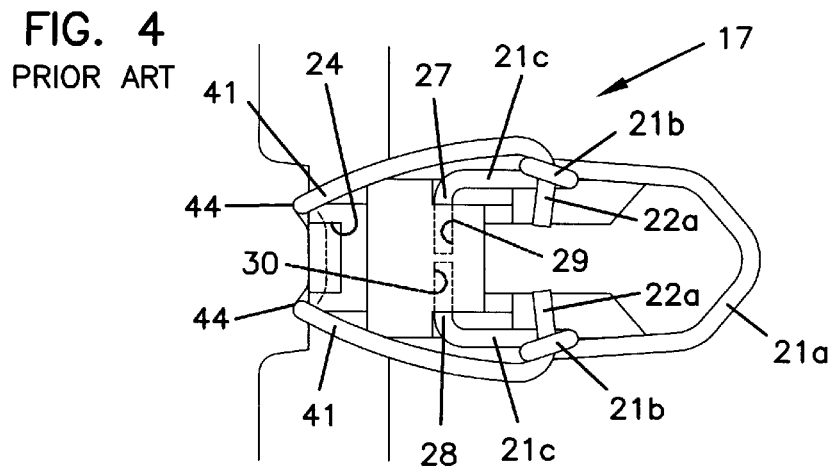
FIG. 4 is a fragmentary schematic top plan view of a prior art latch, according to FIG. 1, depicted in engagement with a portion of a prior art housing, the housing portion being depicted in schematic.
Figure 7:
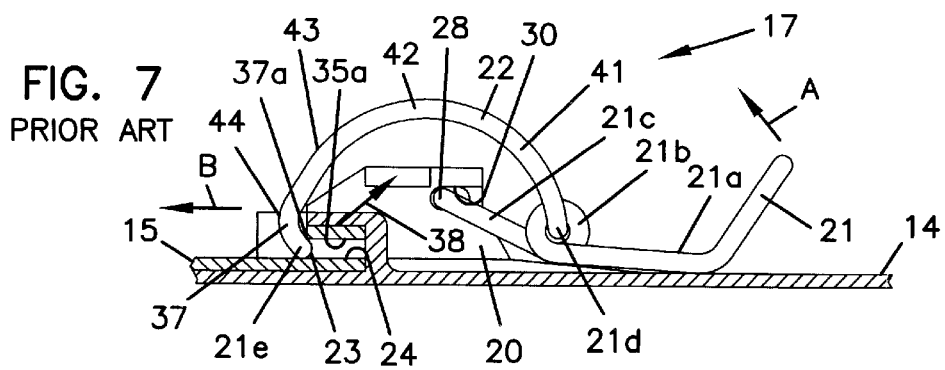
FIG. 7 is a side elevational view of an arrangement according to FIGS. 4–6, with the latch arrangement in FIG. 7 being shown in a closed and latched orientation.

Each one of latches 17 is mounted upon a latch mount 20, on section 14. Each one of latches 17 includes a handle portion or segment 21, and a hook or catch segment 22. In FIGS. 1, 4 and 7, latches 17 are shown in a "locked" or "latched" position. In operation, as discussed in more detail below, if handle segment 21 is moved along the arc indicated generally by arrow A, FIG. 7, latch segment 22 will move in the general direction indicated by arrow B. This will result in a disengagement of tip 23 of hook segment 22 from receiving slot 24 in section 15.

With respect to the operation of latches 17, attention is now directed to FIGS. 4–7. In FIG. 4, a top plan view of latch 17 is depicted. In general, handle 21 includes first and second opposite pins 27 and 28 oriented to engage receiving slots 29 and 30, respectively, in support 20. As a result, handle 21 can pivot on rotation of pins 27 and 28, in the general directions indicated by FIGS. 5, 6 and 7. For typical systems, the mount 20 will be such that the slots or bores 29, 30 are positioned a distance of about 0.62 inch (i.e., about 1.5–1.6 cm) from a point at which the latch 17 engages section 15, when latched; i.e., from the entrance to slot 24.

Figure 3:
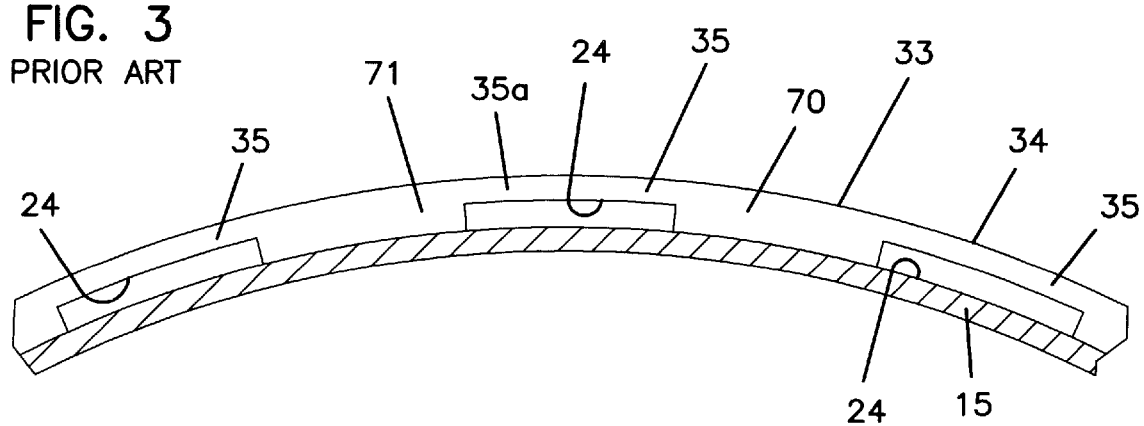
FIG. 3 is an enlarged fragmentary cross-sectional view taken generally along line 3—3, FIG. 2.

In FIG. 3, a fragmentary cross-sectional view taken along line 3—3, FIG. 2 is provided. From a review of FIGS. 2 and 3, it will be apparent that housing section 15 includes, at end 31 thereof, FIG. 2, an outwardly projecting flange 33. Flange 33 includes receiving slots 24 therein. Flange 33 also includes, adjacent outer edge 34 thereof, a circumferential segment or flange area 35. For each slot 24, flange area or segment 35 is a thin strip or segment 35a separating the slot 24 from the edge 34, and partially defining the slot 24.

Figure 5:
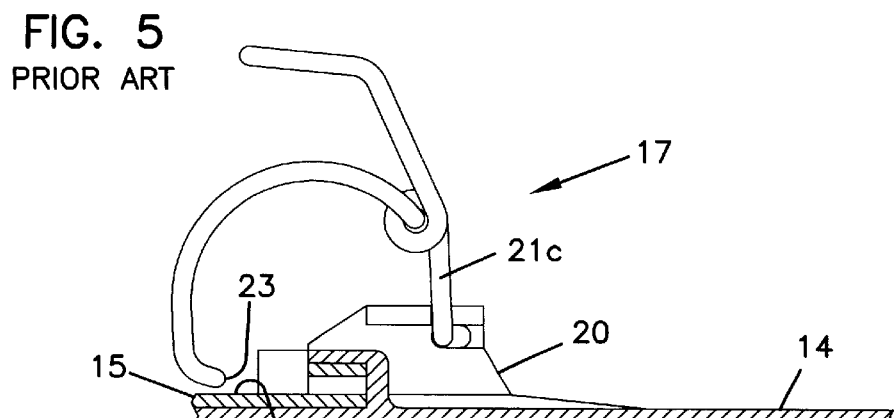
FIG. 5 is a side elevational view of the prior art latch depicted in FIG. 4, with a portion of the housing engaged shown fragmentary and in cross-section; the arrangement in FIG. 5 being shown with a handle portion of the latch swung to an unlatching orientation.
Figure 6:
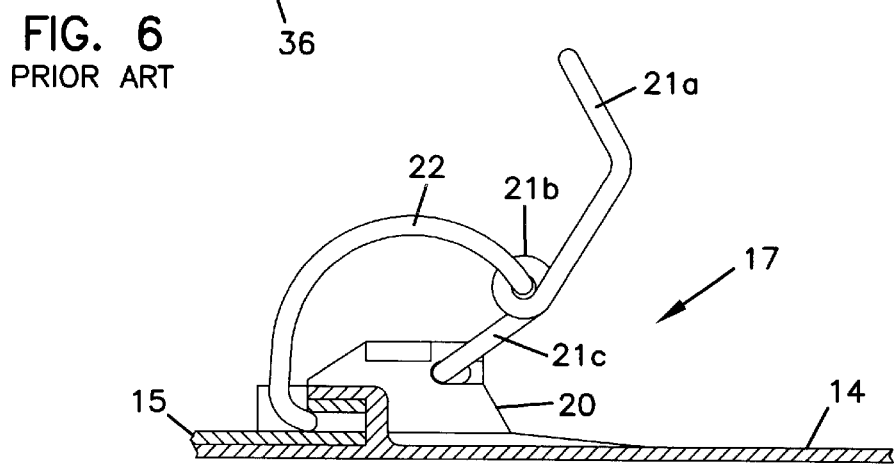
FIG. 6 is a side elevational view of the arrangement shown in FIGS. 4 and 5, taken from an orientation generally analogous to that used for FIG. 5.

Referring now to FIG. 7, in use, when section 14 is brought into engagement with section 15, each one of the latches 17 is brought into alignment with a selected one of the slots 24. Engagement with a slot is shown through the progression of figures as follows: FIG. 5 to FIG. 6 to FIG. 7.

Referring to FIG. 5, handle 21 is shown positioned in the unlatched orientation. Segment 22 has been pivoted to bring lip or tip 23 adjacent to or into engagement with portion 36 of section 15. It has been aligned such that lip 23 is oriented in alignment with receiving slot 24. As shown in the progression from FIGS. 6 to 7, as handle 21 is pivoted toward the locked orientation of FIG. 7, lip 23 is forced into receiving slot 24 and, eventually, when the orientation of FIG. 7 is reached, handle 21 is swung over center, to obtain a lock. Thus, during locking engagement, as shown in FIG. 4, lip 23 is thrust partly into receiving slot 24.

In general, latches of the type shown in FIGS. 1–7, are made from two segments of bent wire. The handle is typically made from wire about 0.086 inch (i.e., about 0.20–0.3 cm) in diameter; the hook portion from wire about 0.08 inch (i.e., 0.06–0.090 inch)(i.e., about 0.1–0.3 cm) in diameter. Usually the wire is a music wire, spring tempered and provided with an anti-rust coating. The wire can be configured so that it can be snapped into place on the mount 20, by hand. It can also be removed and replaced by hand, if desired.

Referring generally to FIGS. 4–7, then, the latch mount 20 comprises a molded plastic extension on housing section 14. The mount 20 includes receiving slots 29, 30, FIG. 4, for receiving pins 27 and 28, respectively.

Handle segment 21 comprises a single bent piece of wire, defining a handle section 21a, central loops 21b and pins 29 and 30. The central loops 21b are oriented for pivotal receipt of a portion of latch segment 22 therein.

Segment 21 may have a variety of shapes, for convenient grasping and operation. Attention is directed to extensions 21c, FIG. 4, between the loops 21b and pins 27 and 28. Referring to FIG. 7, generally the extensions 21c are bent at a true angle, relative to section 21a, with loops 21b positioned on the acute side of the angle. This helps ensure that when the latch arrangement 17 is in the configuration shown in FIG. 7, handle 21 has been swung "over center" to ensure a locking engagement against the spring tension provided by section 22. Alternately stated, when the arrangement is in latched orientation, FIG. 7, hook segment 22 is in tension between points 21d and 21e; and a direct line between 21d and 21e is below pivot pin 28. Thus, the system is under tension, and "over" center, and remains locked.

In this context, the term "true angle" is meant to refer to the angle that would be measured, in three dimensions, between extension 21c and 21a. When projected, as shown in the plan view of FIG. 7, the angle typically has a range of about 150° to 160°, typically 153.9° in size. It must be understood, however, that in FIG. 7, extension 21c projects away from the viewer somewhat, in direction from the loop 21b toward the mounting slot 30. In general, for prior art arrangements such as those shown in FIGS. 4–7, the true angle would only vary a little, perhaps 1°–3°, from the projected angle.

Section 22 is configured with a large arch, in extension between: pins 22a, FIG. 4 (which engage loops 21b) and, end 23. This large arcuate extension is viewable in side elevation, in FIG. 7, and again, provides for some spring tension, when the arrangement 17 locks "over center" as shown in FIG. 7.

Referring to FIG. 7, generally immediately adjacent hook segment lip or tip 23, the hook segment 22 includes a shoulder structure 37, which directly abuts or engages segment 35a, during latching. In FIG. 7, this engagement is indicated at 37a.

The arrangement thus far described, is a prior art air cleaner construction, which, for example, has been manufactured and sold by Donaldson Company, Inc., the assignee of the present invention, throughout the world. It is incorporated in Donaldson products, some of which are sold for use on the types of vehicles and equipment identified above.

The Donaldson Company products referenced in the previous paragraph generally include housing sections made from HIMONT SB-224-2, a commodity grade plastic. Each receiving slot 24 in the housings, is generally a slot about 15–16 cm wide which extends over a radial arc of 8° to 14°. Each section 15 typically includes 16 to 24 slots 24, depending on the housing diameter. Further, the arrangement generally has a lip or segment 35a of plastic about 1–2 mm wide, between each slot 24 and the outer edge 34 over which the hook segment 22 extends, during latching. The hook segment tip 23 is generally received within the slot 24 during latching, as shown in FIG. 7.

In use, some wear or fatigue problems have been observed, in arrangements according to the prior art described above. The wear or fatigue manifests itself in several ways.

For example, where wire shoulders 37 directly engage segment or lip 35a, i.e., at 37a, in time the relatively soft commodity grade plastic is observed to deform. In particular, the hard wire shoulders 37 tend to dig into segment 35a and form grooves therein, weakening the plastic in these locations. This phenomenon is exacerbated, if the person servicing the air cleaner arrangement 1 utilizes the latches 17 to "snug" section 14 against section 15, during assembly. That is, if the person servicing the housing 5 firmly presses section 14 against section 15, before any latching operation is begun, the type of digging of shoulders 37 into lip or segment 35a discussed previously, may still occur but is minimized somewhat. However, it has been observed that in actual practice, persons servicing such housings as those shown in FIGS. 1 and 2 tend to push section 14 toward section 15, but not into complete juxtaposition, before latching is done. When this occurs, the latch 17 is used by the person servicing the air cleaner 1 as a lever, to pull the housing sections 14 and 15 toward one another and into snug engagement. Such a leveraging action typically digs shoulders 37 further into lip or segment 35a.

In addition, the latch design depicted in FIGS. 4–7, tends to leverage segment 35a outwardly somewhat, away from a remainder of the section 15. This is generally indicated by the arrow 38, FIG. 7. This can weaken or fatigue the plastic in the region of segment 35a even further.

A result of the types of phenomena described above can in some instances be a failure of the housing 5, in the region of segment or lip 35a. What has been desired has been an alternate housing/latch design, to minimize this occurrence.

Hereinbelow, three new latch designs are discussed, to address these types of issues, in various manners.

II. A First Latch Design

A first new latch design in accord with certain principles described herein is depicted in FIGS. 8–11 and 14–19 at 50.

Latch 50 is a two-piece wire latch. In particular, FIG. 16, latch 50 comprises handle segment 51 and hook or catch segment 52. The handle segment 51 may be identical to handle segment 21, i.e., it can be a conventional handle segment.

Figure 17:
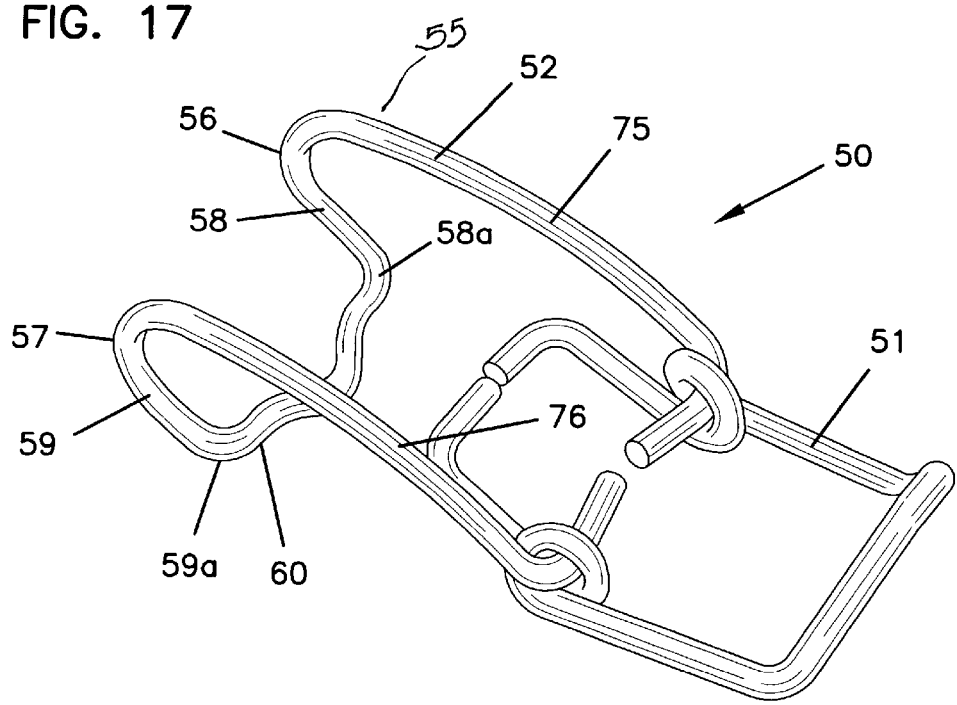
FIG. 17 is a perspective view of the arrangement shown in FIGS. 14–16.
Figure 18:
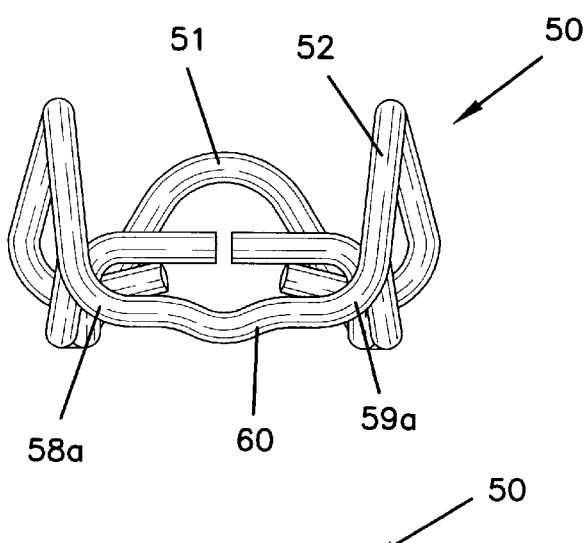
FIG. 18 is an end elevational view of the arrangement shown in FIG. 17, viewing the arrangement looking toward the latch end.
Figure 19:
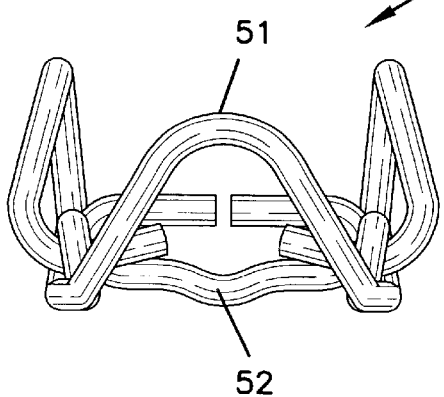
FIG. 19 is an opposite end view to the view shown in FIG. 18.
Figure 20:
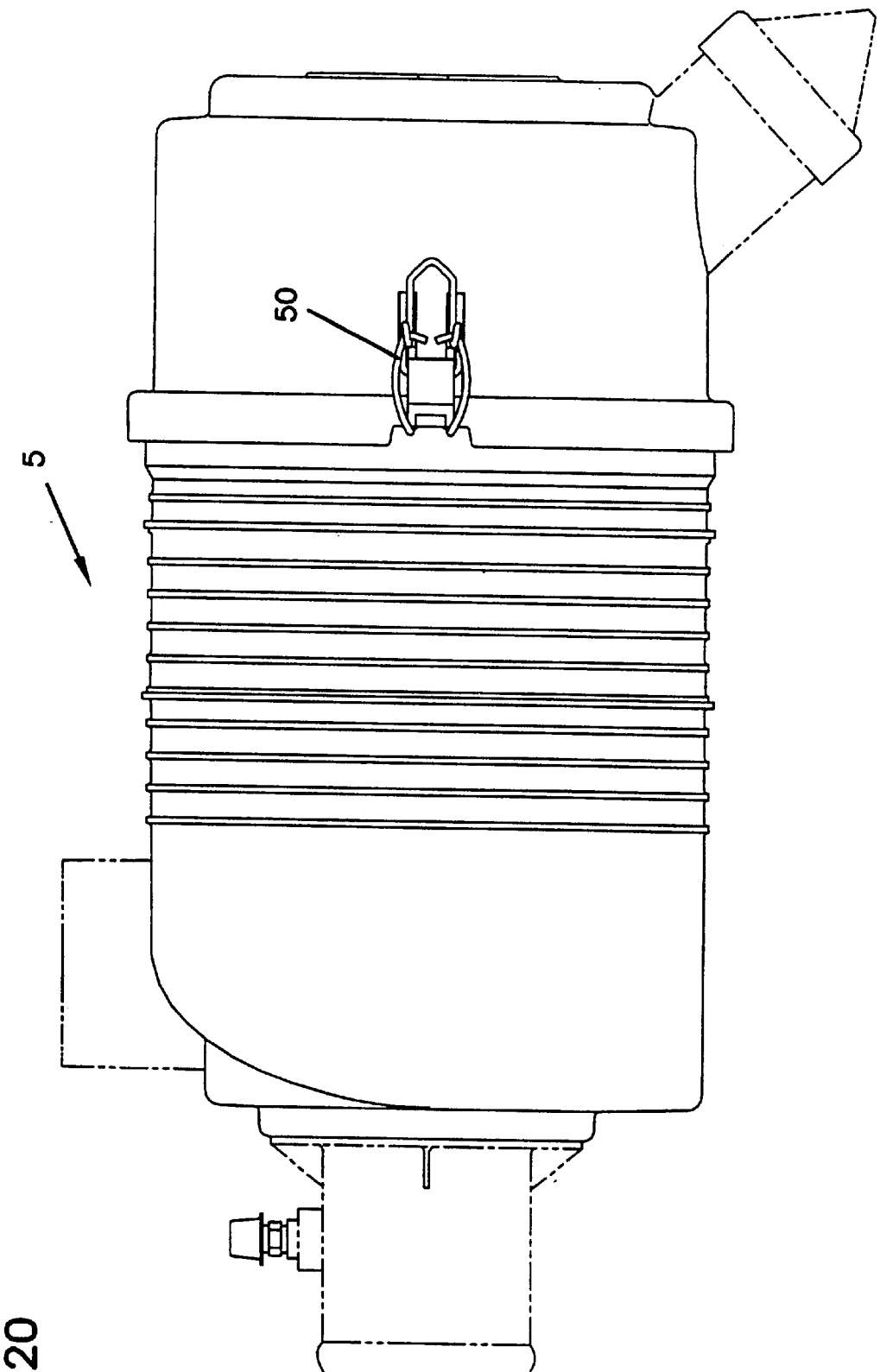
FIG. 20 is a side elevational view of a housing assembly including a latch arrangement according to FIGS. 14–16, thereon.

In FIGS. 14–19, latch arrangement 50 is shown, separately from a housing construction. In FIG. 14, a top plan view is shown; in FIG. 15, a bottom plan view and in FIG. 16, a side elevational view. In FIG. 17, a perspective view of the arrangement is shown; in FIG. 18, an end view looking toward the hook segment 52; and in FIG. 19, an end view opposite that shown in FIG. 18, is depicted. The arrangement 50, is depicted on an otherwise conventional housing 5, in FIG. 17.

Figure 8:
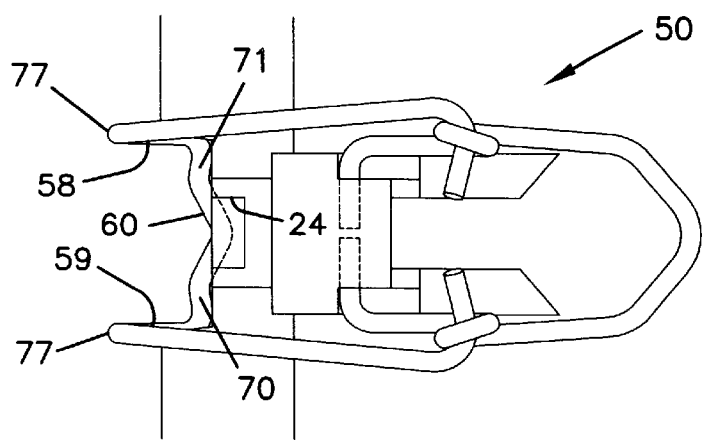
FIG. 8 is a top plan view of a latch arrangement according to a first embodiment of the present invention, depicted in a latched orientation and oriented mounted on a portion of the otherwise prior art housing, shown schematic and fragmentary.
Figure 9:
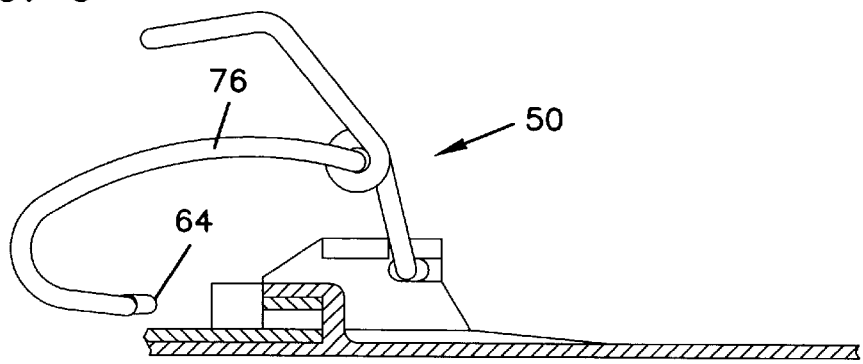
FIG. 9 is a side elevational view of the latch arrangement depicted in FIG. 8; the viewpoint of FIG. 9 being generally analogous to that of FIG. 5 and depicting the new latch arrangement in an unlatched orientation.
Figure 10:
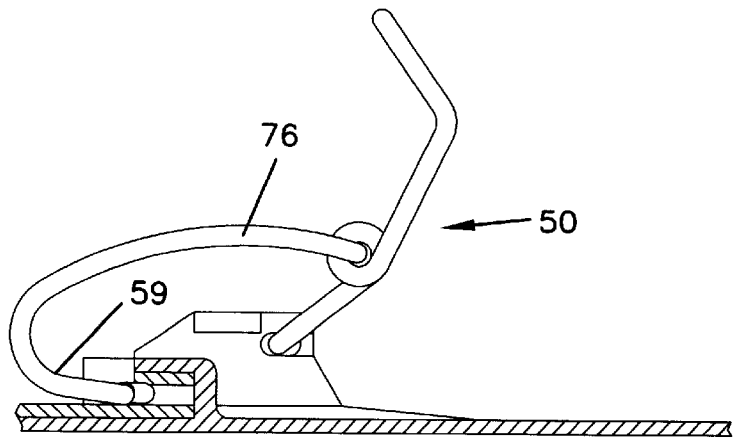
FIG. 10 is a side elevational view of the latch depicted in FIG. 9, shown partially closed; the view of FIG. 10 being generally analogous to the view of FIG. 6.
Figure 11:
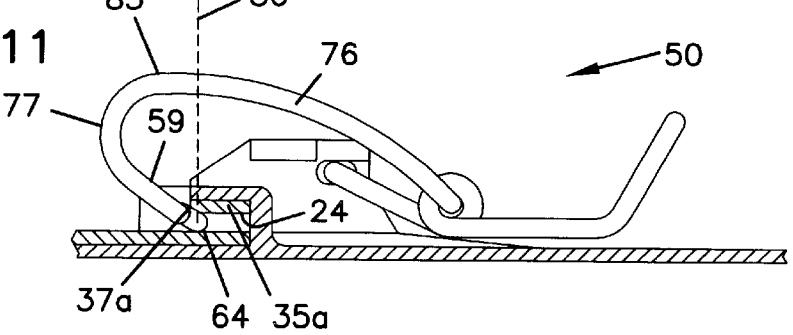
FIG. 11 is a side elevational view of the arrangement shown in FIGS. 8–10, with the latch depicted in a completely closed orientation.

In FIG. 8, a top plan view of latch arrangement 50, mounted on a housing, is depicted. In FIGS. 9–11, latch arrangement 50 is shown in side elevational view, progressing from an unlatched to a latched orientation.

Hook or catch segment 52 of latch 50 differs substantially from segment 22, FIGS. 4–7. These differences lead to significant advantage, as explained below.

In connection with these differences, attention is directed generally to FIGS. 8, 9, 10, 11, 14, 15, 16, 17, 18 and 19. Referring to FIG. 17, the hook segment 52 has an end 55 which includes shoulders 56 and 57, extensions 58 and 59; and, lip 60. Lip 60 extends between extensions 58 and 59. The extensions 58 and 59 are secured to a remainder of the hook segment 52, by shoulders 56 and 57. Thus, together extensions 58, 59 and shoulders 56, 57 define two hook extensions. Significantly, a lateral extension of lip 60, viewable in FIG. 17 as extending between points 58a and 59a is wider than an associated receiving slot 24, in a housing 5. This is viewable in FIG. 8.

More specifically, FIG. 15, lip 60 includes a center projecting tip 64 defined by an obtuse-angled bend in the lip and lateral arms or extensions 65 and 66. In use, tip 64 is sized and configured to project into a receiving slot 24. Lateral arms or extensions 65 and 66 are sized and configured to bear on housing section 14 at portions on opposite sides of slot 24, indicated generally at 70 and 71 in FIGS. 3 and 8. In addition, extensions 58 and 59, FIG. 8, are sized and configured to help inhibit shoulders 56 and 57 from strongly bearing into segment 35, when the latch 50 is engaged, FIG. 11.

As a result of this configuration, when latch 50 is engaged, tip 64 is pushed into receiving slot 24, for secure engagement between sections 15 and 14. Extensions 65 and 66 bear on portions 70 and 71, so that shoulders 56 and 57 do not bear directly into segment 35a. Thus, the hook segment 52 will not tend to bear directly into segment 35a, in the manner of segment 22 of the prior art arrangement shown in FIGS. 4–7. In this manner, a certain type of the damage, the damage from direct bearing of the shoulders 37 on relatively thin segment 35a, FIG. 4, is reduced or avoided.

In general, extensions 65 and 66, FIG. 15, are co-planer. That is, the two relatively straight sections of lip 16 extend in opposite direction but generally in the same plane. Preferably they are also "relatively" co-linear; i.e., they are either co-linear or project at an angle within about 9–11° of one another, from where the hypothetical central lines of them would intersect. They do not extend relatively straight over a very great distance, typically only about 0.03 to 0.09 inch (i.e., about 0.06–0.3 cm).

In general, herein, preferred lengths and angles are described. It is recognized that wire bending is not always a precise operation, and that some variation may occur. However, the particular descriptions of lengths, angles, etc., provided are preferred and generally advantageous.

The latch design 50 is also configured to reduce pressures that generate an outward leverage or tear on segment 35a, in use. Features concerning this relate to the lengths of extensions 58 and 59, the direction toward which they project, the shape and locations of shoulders 56 and 57, and the arch to extensions 75 and 76, FIG. 17. Again, extensions 58, 59, shoulders 56, 57 and extensions 75, 76 generally define two laterally spaced hook extensions in hook member 52.

Attention is directed to a comparison of FIGS. 7 and 11. In FIG. 7, the prior art latch 17 is shown in side elevation, as it would appear when mounted on a latch mount 20, and secured in a closed or latched position, with latching force securing section 14 to section 15 oriented more or less horizontal. In FIG. 11 an analogous view is depicted of latch design 50.

Turning first to FIG. 7, the prior art arrangement, attention is directed to extension 41. Extension 41 is arcuate. An "apex" 42 of the arc relative to the tip 23 of latch 17, when latched closed, i.e., from the side elevational view of FIG. 7, is located to the "handle side" of the following features: tip 23 and the point 37a of entry of tip 23 into slot 24. The term "apex" when used in this context, refers to the highest point of bend in arch 41, when viewed from the side elevation as shown in FIG. 7.

In addition, referring to FIGS. 4 and 7, the size of the arc of arch of segments 41 is such that sections 43 extend in a direction generally slanted upward toward and over the latch mount 20 from apices 44 in shoulders 37.

Attention is now directed to FIG. 11, a side elevational view showing the new latch design 50 in a locked or latched orientation. Extension 76 has its apex, or highest point, 85 oriented somewhat forwardly. For example, whereas apex 42 of FIG. 7 is shown almost directly over the pivots 27, 28 of handle 21, apex 85, FIG. 11, is positioned substantially more forwardly of this location, i.e., more toward housing section 14. Indeed, apex 85 is located either directly over slot 24, or forwardly thereof. It is also located either directly over segment 35a and engagement point 37 or forwardly thereof.

Herein when it is said that the apex 85 is located directly over forwardly of some feature, reference is meant to when the feature is viewed in side elevation, analogously to the view of FIG. 11, with portions of clamping shown generally horizontal. For example, in FIG. 11, a phantom line 86 is shown passing vertically from slot 24, segment 35a and tip 64. Apex 85 is either intersected by line 86 or is located within an angle defined by 5° on either side of line 86. When these circumstances are met, the apex 85 is characterized as "substantially directly" or "directly" over the feature through which the hypothetical vertical line is drawn. Of course, "directly over" in this context refers to the planer projection of FIG. 11, and thus accounts for the fact that the apex 85 is actually closer to the viewer than the slot 24, in three dimensions.

Further, referring still to FIGS. 11 and 8, extension 76 is sufficiently long so that elongate extensions 58 and 59 project well away from slot 24, in a direction generally opposite to second section 14, a distance of at least 1.1–1.4 inches (i.e., about 2.7–3.6 cm), preferably 1.298 inches (i.e., about 3.2–3.3 cm), before the tight bends or curves 77 are encountered. Extension 75 is analogously shaped (as a mirror image).

The features described with respect to the shape and length of extensions 75 and 76 help ensure that when handle segment 51 is positioned in the over center and locked orientation, FIG. 11, hook segment 52 tends to pull against sides 70 and 71 in a direction more directly toward section 14 and latch mount 20 with a lesser component of outward tear against segment 35a, than the arrangement of the prior art, FIGS. 4–7. Indeed, by utilizing an appropriate length and curvature for extensions 75 and 76, outward tearing force on segment 35a can be greatly reduced.

III. A Second Latch Design

Figure 12:
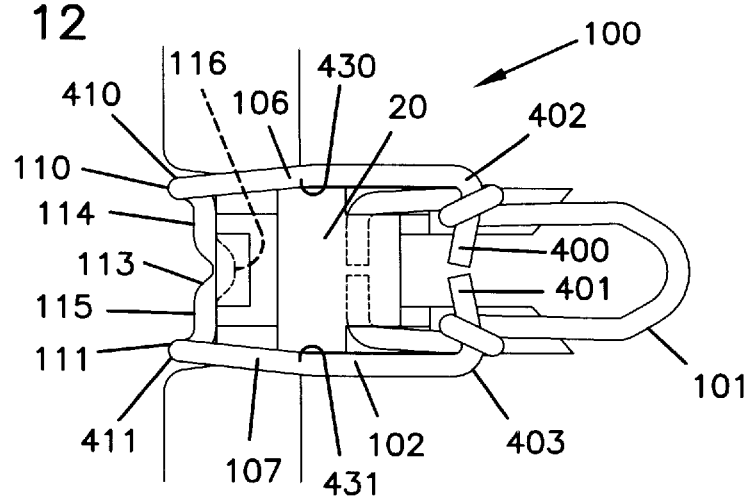
FIG. 12 is a top plan view of a second embodiment of a latch arrangement according to the present invention, depicted mounted on a housing arrangement in a closed orientation, the housing arrangement being depicted fragmentary; the arrangement of FIG. 12 being a view generally analogous to those depicted in FIGS. 4 and 8.
Figure 13:
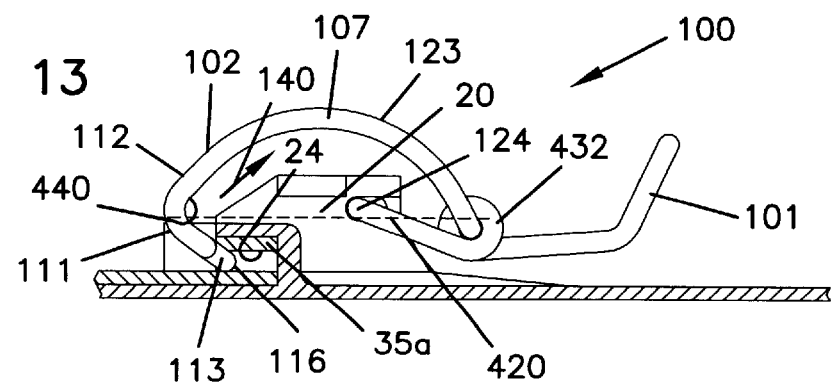
FIG. 13 is a side elevational view of an arrangement shown in FIG. 12, FIG. 13 depicting the latch arrangement in completely closed orientation and being generally analogous in viewpoint to the views of FIGS. 7 and 11.

Attention is now directed to FIGS. 12 and 13, in which a second latch design incorporating selected features according to the present invention as depicted. In general, the latch design shown in FIGS. 12 and 13 utilizes a lip configuration somewhat analogous to that shown for the arrangement in FIGS. 8–11, configured to bear on sections 70 and 71 to the side of slot 24, rather than on segment 35a. The arrangement of FIGS. 12 and 13, however, does not utilize the extended arcuate sections 75 and 76, FIGS. 8–11, to avoid the outward pressure force against segment 35. The second latch design of FIGS. 12 and 13, then, generally relieves much of the problem of latch shoulders digging directly into segment 35a, but does not as greatly relieve pressure pulling outwardly on segment 35a, during over center locking, as does the arrangement of FIGS. 8–11.

Referring more specifically to FIGS. 12 and 13, latch design 100 is depicted. Latch 100 includes a handle segment 101 and a hook or latch segment 102. The handle segment 101 may be identical to handle segments 51 and 21, discussed above.

Still referring to FIGS. 12 and 13, hook or latch segment 102 includes side extensions 106 and 107, shoulders 110 and 111, and hook projection or end 113 having extensions 114 and 115 with depending tip 116 positioned therebetween. The extensions 114 and 115 are sized and configured to bear on sides 70 and 71, when the latch 100 is engaged, FIGS. 12 and 13. In this manner, extensions 114 and 115 operate generally analogously to extensions 65 and 66, FIG. 15, discussed above. That is, in operation, latch design 100 is constructed and configured so that shoulders 110 and 111 do not as directly bear on segment 35a, in use. Rather, much of the load bearing caused by engagement of latch design 100, is on sides 70 and 71, analogous to the design of FIGS. 8–11.

On the other hand, side extensions 106 and 107 of the arrangement shown in FIGS. 12 and 13 are generally analogous to the side extensions of the prior art arrangement shown in FIGS. 4–7. Referring to the side elevational view of FIG. 13, extension 107 is arcuate, and has an apex at 123, which is positioned generally over latch mount 20, and almost directly over pivot 124. In general, it is well toward handle segment 101 from: receiving slot 24 and segment 35a. In addition, extensions 106 and 107 are configured such that shoulders 110 and 111 are more closely adjacent to slot 24, when the latch 100 is engaged, and portion 112 extends generally upwardly toward apex 123 from shoulders 110 and 111. This means that when arrangement 100 is engaged (i.e., locked over center), there are forces generally along the direction indicated by arrow 140, FIG. 13, which pull outwardly on segment 35a somewhat. Thus, as explained above, the arrangement 100 of FIGS. 12 and 13, tends to lessen problems of shoulder engagement with segment 35a, of the type illustrated and discussed in connection with the prior art arrangement of FIGS. 4–7, but it does not greatly lessen the outward pull described in connection with the prior art arrangement (which is reduced or minimized as a result of the configuration of extensions 75 and 76, as described in connection with the latch design 50 of FIGS. 8–11 and 14–19).

SPECIFIC EMBODIMENTS

From the previous descriptions, general principles of operation of various latch arrangements according to the present invention will be understood. In this section, some detailed disclosure of specifications, procedures, materials, etc. for some preferred embodiments, are provided.

The Housing

In general, in many preferred embodiments, the housing will be manufactured from a polypropylene plastic, typically HIMONT SB-224-2.

Plastic housings usable in air cleaner arrangements according to the disclosures herein may be manufactured in a variety of sizes and shapes. Generally, internal diameters of about 4 inches to 8 inches (i.e., about 10–21 cm), and external lengths of about 7 inches to 16 inches (i.e., about 17–41 cm), will be involved. Such housings could be used, for example, in a variety of vehicles and equipment such as backhoes, skid steer loaders, wheel loaders, tractors, sprayers, generators, small trucks and passenger vehicles.

Typically, the sidewall of the housing will be molded to a thickness of about 0.07 to 0.12 inch (i.e., about 0.1–0.3 cm), using injection molding techniques. The flange corresponding to flange 33, FIG. 3, will generally be about 6–8 mm wide, 4–6 mm thick, and include slots therein evenly spaced and having an arcuate extension of about 8–14°. Typically for such arrangements, the width of the slots 24 will be about 2 to 5 mm, and the length about 14 to 18 mm. This will leave, in segment 33, an outer rim 35a, FIG. 3, about 1 to 2 mm thick.

The housings may be molded with a wide variety of inlet and outlet configurations, and with or without optional discharge vents. The arrangements can be designed with cyclonic action, for prefiltering, if desired. The arrangements may be designed for a variety of sealing configurations, to various filter elements. Products such as Donaldson's FPG air cleaners, are generally configured for utilization with radial seal arrangements such as those described in European patent 0 329 659, the complete disclosure of which is incorporated herein by reference. A variety of element designs can be used with such housings, including ones having similar configurations. In addition, a variety of specific configurations for the radial sealing portion can be used, including preferred stepped rather than smooth designs.

Of course, the housing will typically be molded in two sections, with the latch mounts molded integrally with one of the sections. The latch mount will typically have pivot holes or bores extending therein (or therethrough), having a diameter of about 2–4 mm. The pivot holes will typically be located about 1.5–2.5 cm, from the entrance to the receiving slot 24, when the housing 5 is assembled.

The Wire Latch Arrangements

A variety of specific shapes can be utilized for the wire latch arrangements. Even accounting for the features defined herein for preferred operation, a variety of bent wire configurations are feasible. The particular arrangement of FIGS. 14–19 is preferred, at least in part, because it provides an attractive and eye-catching appearance, when used on a housing. The arrangement of FIGS. 14–19 does, of course, include preferred sizes and curvature to certain sections, for preferred operation. However, it should be apparent that the specific principles described herein can be employed in latch arrangements having a variety of appearances.

When the wire latch arrangement of FIGS. 8–11 (and FIGS. 14–19) or the second embodiment of FIGS. 12 and 13 are involved, wire material is used for the two latched segments. Generally, music wire, spring temper, zinc plate, yellow chromate wire having a diameter of about 0.06 to 0.09 inch (typically of 0.08 inch)(i.e., about 0.1–0.3 cm) will be used. Such a wire is available from Dudek and Bock, 5100 W. Roosevelt Road, Chicago, Ill.

The handle segment (51, 101) is generally formed from a single wire piece about 4.5–5.5 inches long (i.e., about 11–14 cm), preferably about 5.262 inches (i.e., about 13.3–13.4 cm). Referring to FIGS. 14–18, each pin 301, 302 extends over a distance of about 0.1–0.3 inch (i.e., about 0.2–0.8 cm), preferably about 0.245 inch (i.e., about 0.6–0.7 cm), to a 90° bend 303, 304. Each loop 305, 306 begins a distance of about 0.36–0.42 inch (i.e., about 0.9–1.1 cm), preferably about 0.384 inch (i.e., about 0.9–1 cm) from the center of the associated bend (303, 304), and is twisted over a radius of about 0.07–0.12 inch (i.e., about 0.1–0.2 cm), preferably about 0.097 inch (i.e., about 0.2–0.3 cm), leaving an aperture in each loop of about 0.06–0.16 inch (i.e., about 0.1–0.5 cm), preferably about 0.114 inch (i.e., about 0.2–0.3 cm) diameter. From the end of each loop (305, 306) to the beginning of each next associated bend (307, 308), will generally be an extension about 0.4–0.7 inch (i.e., about 1–1.8 cm) long, preferably about 0.582 inch (i.e., about 1.4–1.5 cm). The bends (307, 308) are at an angle of about 131–135°, preferably about 133.9°. The distance from bend 307 to center bend 309, FIG. 14, is about 0.2–0.5 inch (i.e., about 0.5–1.3 cm), preferably about 0.366 inch (i.e., about 0.9–1 cm). The distance from bend 307 to center bend 309 is preferably the same.

Referring to FIG. 16, angle 310, the projected angle between section 312 and section 313 will generally be about 152 to 156°, most preferably about 153.9°. The true angle will vary somewhat from this projected angle by a few degrees. The "true" angle is the angle that would be measured in 3 dimensions between section 312 and section 313. Angle 315, the projected angle between section 316 and section 317, FIG. 14, will generally be over an angle of about 130 to 136°, typically 133.9°. The true angle will vary slightly (within a couple of degrees). Finally, angle 308, in the tip 309 of handle 51, FIG. 17, generally extends over an angle of about 50 to 60°, typically 55°.

As indicated in the descriptions above, the latch segments from the arrangements of FIGS. 8–11 (14–19) and the second arrangement of FIGS. 12 and 13, differ. Attention will first be directed to the latch segment 52 of FIGS. 8–11 (and 14–19).

Referring first to FIG. 15, a distance between points 330 and 331, in lip 60, i.e., the distance lip 60 extends between extensions 58 and 59, is generally about 0.5 to 0.7 inch (i.e., about 1.2–1.8 cm), preferably about 0.63 inch (i.e., about 1.6–1.7 cm). Along this distance, each arm 65, 66 extends a distance of about 0.04–0.08 inch (i.e., about 0.1–0.3 cm), typically about 0.060 inch (i.e., about 0.1–0.2 cm), and bends over a radius about 0.03–0.07 inch (i.e., about 0.05–0.2 cm), typically about 0.050 inch (i.e., about 0.1–0. cm), at curves 332, 333 respectively, downwardly to tip 64. The length of extensions between bends 332, 333 and tip 64, is typically about 0.130 to 0.190 inch (i.e., about 0.3–0.5 cm), preferably about 0.160 inch (i.e., about 0.4–0.5 cm). In general, as a result of the curves, lip 60 has a total length between points 330 and 331 of about 0.5–1 inch (i.e., about 1.2–2.6 cm), typically about 0.706 inch (i.e., about 1.7–1.8 cm), with the linear distance between points 330 and 331 being about 5 to 20%, typically about 10.8% shorter than the actual length in extension of the lip 60.

Tip 64 projects a distance of at least 0.07–0.09 inch (i.e., about 0.1–0.3 cm), typically about 0.085 inch (i.e., about 0.2–0.3 cm) from each arm 65, 66.

Preferably, the arms at 65, 66, extend a distance about 0.130 to 0.150 inch (i.e., about 0.3–0.4 cm) beyond the side edges of the slot 24, during use, for engagement in preferred manner as described. In general, analogous dimensions would be utilized for the lip 113, of the embodiment shown in FIGS. 12 and 13.

Still referring to the first embodiment shown in FIGS. 8–11 (and 14–19), attention is now directed to the remainder of the hook or latch segment 52. Referring to FIG. 14, assembly 52 is generally bent from a single piece of wire about 4.5–5.5 inches (i.e., about 11.4–14 cm) long, typically about 5.014 inches (i.e., about 12–13 cm). Extensions 350, 351 extend over a straight distance about 0.1–0.4 inch (i.e., about 0.2–1 cm), typically about 0.220 inch (i.e., about 0.5–0.6 cm), before bending around curves 352, 353, at an angle of about 60–80°, typically about 70.6°. Pins 350, 351, then, project through loops 305, 306 in section 51, for secure pivotal engagement.

The distance between bends 352, 353 and the beginning of bends 355, 356, for each arcuate side of the extensions 350, 351, is about 1–1.5 inches (i.e., about 2.5–3.9 cm), typically about 1.169 inches (i.e., about 2.8–3.1 cm). The distance directly, along dotted line 360, FIG. 16, between curves 353 and 356, is about 1–1.4 inches (i.e., about 2.5–3.6 cm), typically about 1.14 inches (i.e., about 2.8–3 cm). Thus, the arc of section 370 is typically on a radius of about 1.3 to 1.6 inches (i.e., about 3.3–4.1 cm), preferably about 1.50 inches (i.e., about 3.8 cm). The linear distance, along line 360, is about 1–5%, typically about 3% shorter than the arcuate length.

Notice from FIGS. 14 and 15 that preferably extensions 350, 351 do not bow substantially relative to one another. Rather, they are relatively straight extensions between curves 352, 353 and curves 355, 356, when viewed from top plan view.

Referring to FIGS. 15 and 16, for each extension (75, 76), preferably a center 380 of bend 381 is located, linearly, a distance at least about 1.1–1.5 inches (i.e., about 2.7–3.9 cm), typically about 1.295 inches (i.e., about 3.2–3.3 cm) from pivots 353/352, in the latched orientation FIG. 11. Also preferably the arcuate extension of sections 75, 76 is such that the apex 85 is located either over slot 24 or forwardly of slot 24 (within 50), FIG. 11.

Referring to FIG. 16, preferably curve 380 is around a radius of about 0.1–0.2 inch (i.e., about 0.2–0.6 cm), typically about 0.170 inch (i.e., about 0.4–0.5 cm). Also preferably side extensions 58 and 59, FIG. 18, extend a distance of about 0.1–0.3 inch (i.e., about 0.2–0.8 cm), typically about 0.280 inch (i.e., about 0.7 cm) before curves 330, 331 are encountered.

In general, then, the configuration shown in FIGS. 8–11 and 14–19 generally includes certain preferred features. If one selects wires of the diameters and lengths described, and bends to the configuration shown in these figures, a useful latch arrangement can be readily constructed.

Referring to FIG. 16, preferably the distance between points 387 and 388, along line 389, is 0.7–0.9 inch (i.e., about 1.7–2.3 cm), preferably 0.845 inch (i.e., about 2.1–2.2 cm).

Attention is now directed toward the arrangement of FIGS. 12 and 13. Segment 101 can generally be as described above, for segment 51.

Also preferred "sizes" and shapes for lip 113, and especially arms 114, 115 and tip 116 were described, for the embodiment of FIGS. 8–11 (and 14–19). An analogous shape to that utilized for the arrangement of FIGS. 8–11 (and 14–19) can be used, for the embodiment of FIGS. 12 and 13.

As to the remainder of handle segment 102, attention is now directed to the specific configuration shown in FIGS. 12 and 13. The length of pins 400, 401 and the size of curves 402, 403 may be generally as described above for the arrangement of FIGS. 8–11 (14–19). In general, a wire having an overall length of about the same as in the prior art arrangement (FIGS. 4–7), will be useful for a typical latch segment 102. Each extension will bend over a substantial arc, typically over a radius of about 0.5–0.7 inch (i.e., about 1.2–1.8 cm), typically about 0.6 inch (i.e., about 1.5–1.6 cm)(although sometimes somewhat flattened from circular). Also, referring to FIG. 12, there is sometimes preferably somewhat of a slight bow between sections 430 and 431.

Apex 123 will generally be located above a part of the arrangement positioned between the entrance to slot 24 and loops 432, typically centrally therebetween, and most typically either directly over pivot 124 or within about 10° of a line drawn perpendicularly to the horizontal in FIG. 13, and through pivot 124, with pivot point 124 as the origin. Typically, apex 123 will be positioned a distance of at least about 0.1 inch (i.e., about 0.2 cm) and typically 0.2 to 0.4 inch (i.e., about 0.5–1 cm), above or higher than pivot point 124, when viewed from the orientation of FIG. 13.

Still referring to FIG. 13, generally bend 440 is around a radius of about 0.02–0.10 inch (i.e., about 0.05–0.3 cm), typically about 0.05 inch (i.e., about 0.1–0.2 cm).

We claim:

1. A locked combination comprising:
   (a) an air cleaner housing having first and second housing sections;
      (i) said first housing section comprising a molded plastic section having a molded plastic latch mount thereon;
      (ii) said second housing section comprising:
         (A) a molded, plastic outwardly projecting circumferential flange having a first elongate receiving slot therein;
         (B) said outwardly projecting flange including a flange outer edge and a flange area separating the first elongate receiving slot from the flange outer edge;
         (C) said outwardly projecting circumferential flange having first and second portions positioned at opposite ends of said first elongate receiving slot;
   (b) a two-piece wire latch arrangement pivotally mounted on said molded plastic latch mount; said two-piece wire latch arrangement including a handle segment and a latch segment;
      (i) said handle segment comprising a single piece of bent wire having first and second ends pivotally mounted to said molded plastic latch mount;
      (ii) said latch segment comprising a single piece of bent wire having first and second ends pivotally mounted to said handle segment;
         (A) said latch segment including: a hook segment having first and second, spaced, shoulders; first and second, spaced, shoulder extensions and a lip;
         (B) said lip extending between said first and second, spaced, shoulder extensions; said lip including a center projecting tip defined by an obtuse-angled bend in said lip and first and second, generally oppositely directed, lateral extensions;
            (1) said first and second, generally oppositely directed, lateral extensions including first and second bearing surfaces, respectively;
   (c) said first elongate receiving slot having a first length;
   (d) said latch segment having a total distance between said first and second, spaced, shoulder extensions, where said lip joins said first and second shoulder extensions, of greater than said first length of said first elongate receiving slot;
   (e) said projecting tip of said lip projecting into said first elongate receiving slot;
   (f) said first and second, bearing surfaces bearing, respectively, on said first and second portions of said outwardly projecting circumferential flange at opposite ends of said first elongate receiving slot for spreading load across said first and second portions of said outwardly projecting circumferential flange; and
   (g) whereby said handle segment and latch segment are pivotally movable to position said projecting tip outside of said first elongate receiving slot to unlock the first housing section from the second housing section.

2. A combination according to claim 1, wherein:
   said latch segment hook segment comprising first and second, spaced, hook extensions;
   (a) said first hook extension including a first arcuate extension arm and a first curved hook end; said first curved hook end comprising said first shoulder and said first shoulder extension; said first arcuate extension arm being curved on a radius of at least 33 mm;
   (b) said second hook extension including a second arcuate extension arm and a second curved hook end; said second curved hook end comprising said second shoulder and said second shoulder extension; said second arcuate extension arm being curved on a radius of at least 33 mm.

3. A combination according to claim 1, wherein said first and second lateral extensions of said lip extending a distance of at least 3mm beyond an end of said flange outer edge.

4. A combination according to claim 1, wherein:
   (a) said first elongate receiving slot first length is at least 14 mm.

5. A combination according to claim 4, wherein:
   (a) said tip depends at least 1mm from said first and second, generally oppositely directed, lateral extensions.

6. A combination according to claim 5, wherein:
   (a) said first shoulder extension extends between said first shoulder and said lip a distance of at least 2 mm; and,
   (b) said second shoulder extension extends between said second shoulder and said lip a distance of at least 2 mm.

7. A combination according to claim 5, wherein:
   (a) said first and second arcuate extension arms are sized and configured such that an apex of each extension arm is positioned directly above said depending tip of said lip.

8. A combination according to claim 5, wherein:
   (a) said first and second extension arms each has a length of at least 25.4 mm curved such that a linear distance between end points of the arcuate extension is about 1% to 5% shorter than a length of each extension arm.

9. A combination according to claim 8, wherein:
   (a) said first curved hook end is curved on a radius of 2–6 mm; and
   (b) said second curved hook end is curved on a radius of 2–6 mm.

10. A combination according to claim 9, wherein:
   (a) said first and second lateral extensions of said lip each define a curve being bent on a radius of about 0.03–0.07 inch.

11. A combination according to claim 10, wherein:
(a) said lip extends a distance of about 16mm between said first and second shoulder extensions.

12. A combination according to claim 5, wherein:
(a) said first curved hook end is curved on a radius of 2–6 mm; and
(b) said second curved hook end is curved on a radius of 2–6 mm.

13. A combination according to claim 12, wherein:
(a) said handle segment comprises first and second pin sections; first and second loop sections; and a handle section;
   (i) said first pin section having said first handle segment end;
   (ii) said second pin section having said second handle segment end;
   (iii) said handle section extending between said first and second loop sections;
   (iv) said first pin section being angled relative to said handle section at an angle of at least 152°; and
   (v) said second pin section being angled relative to said handle section at an angle of at least about 152°.

14. A combination according to claim 13, wherein:
(a) said latch segment first end is received by said first loop section; and
(b) said latch segment second end is received by said second loop section.

15. A combination according to claim 14, wherein:
(a) said first lateral extension of said lip is a distance of at least about 17 mm from said first loop section; and
(b) said second lateral extension of said lip is a distance of at least about 17 mm from said second loop section.

* * * * *

UNITED STATES PATENT AND TRADEMARK OFFICE
CERTIFICATE OF CORRECTION

PATENT NO.    : 6,022,055
DATED         : February 8, 2000
INVENTOR(S)   : Coulonvaux et al.

It is certified that error appears in the above-identified patent and that said Letters Patent is hereby corrected as shown below:

Title page,
Item [56] References Cited, U.S. Patent Documents:
Add missing reference -- 5,755,842  5/1998  Patel et al. --

Item [56] References Cited, Foreign Patent Documents: "85 24 040 U" should read -- 85 24 040.0 --

Signed and Sealed this

Ninth Day of October, 2001

*Attest:*

NICHOLAS P. GODICI
*Acting Director of the United States Patent and Trademark Office*

*Attesting Officer*